April 23, 1963
J. R. NELSON ET AL
3,086,249
METHOD OF PRODUCING COMPOSITE PLASTIC ARTICLES
Filed Dec. 11, 1959
5 Sheets-Sheet 1
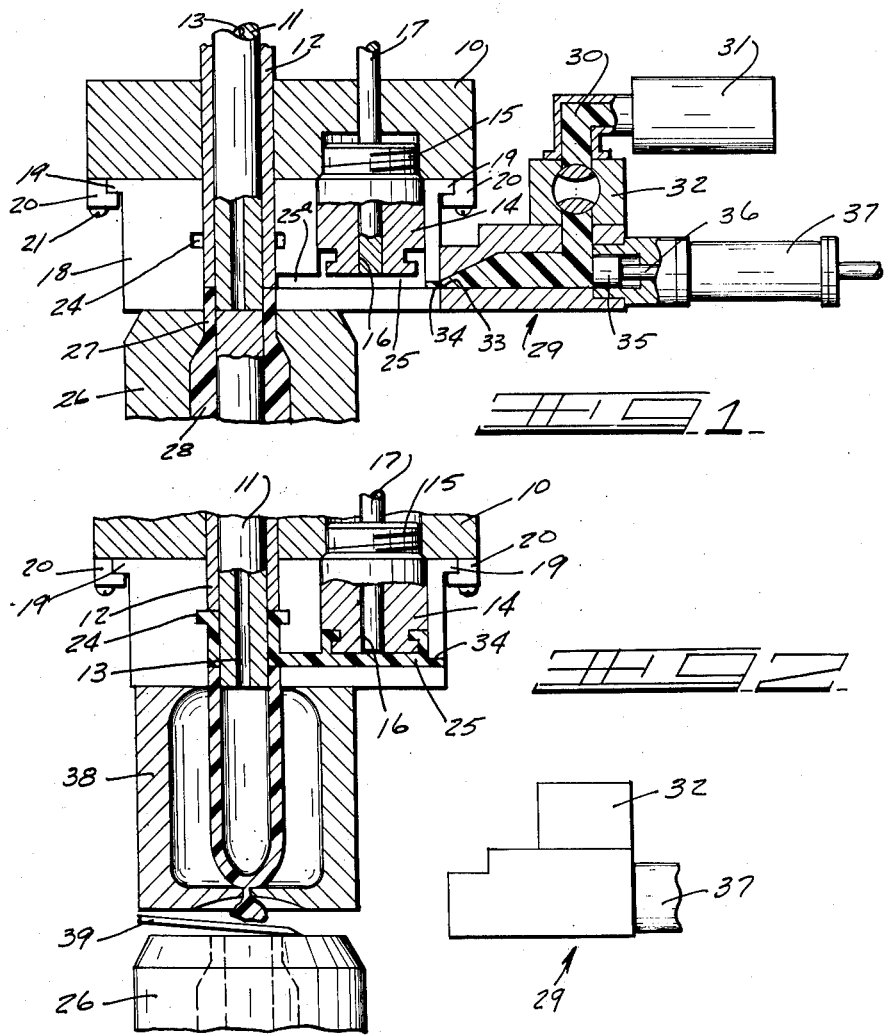
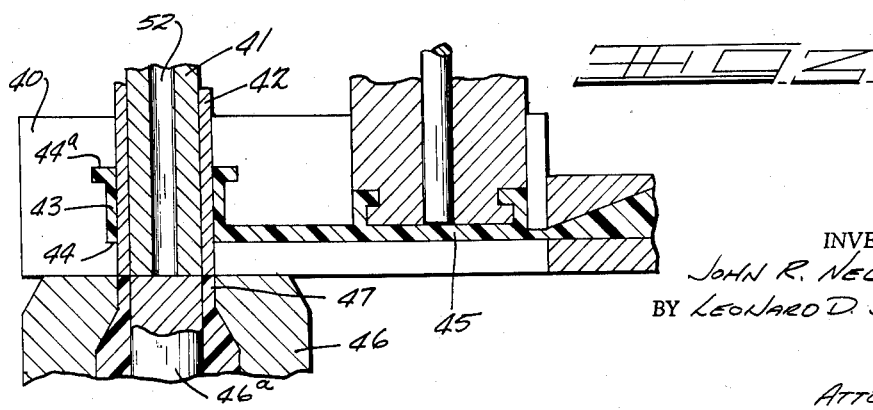
INVENTORS
John R. Nelson
BY Leonard D. Soubier
ATTORNEYS

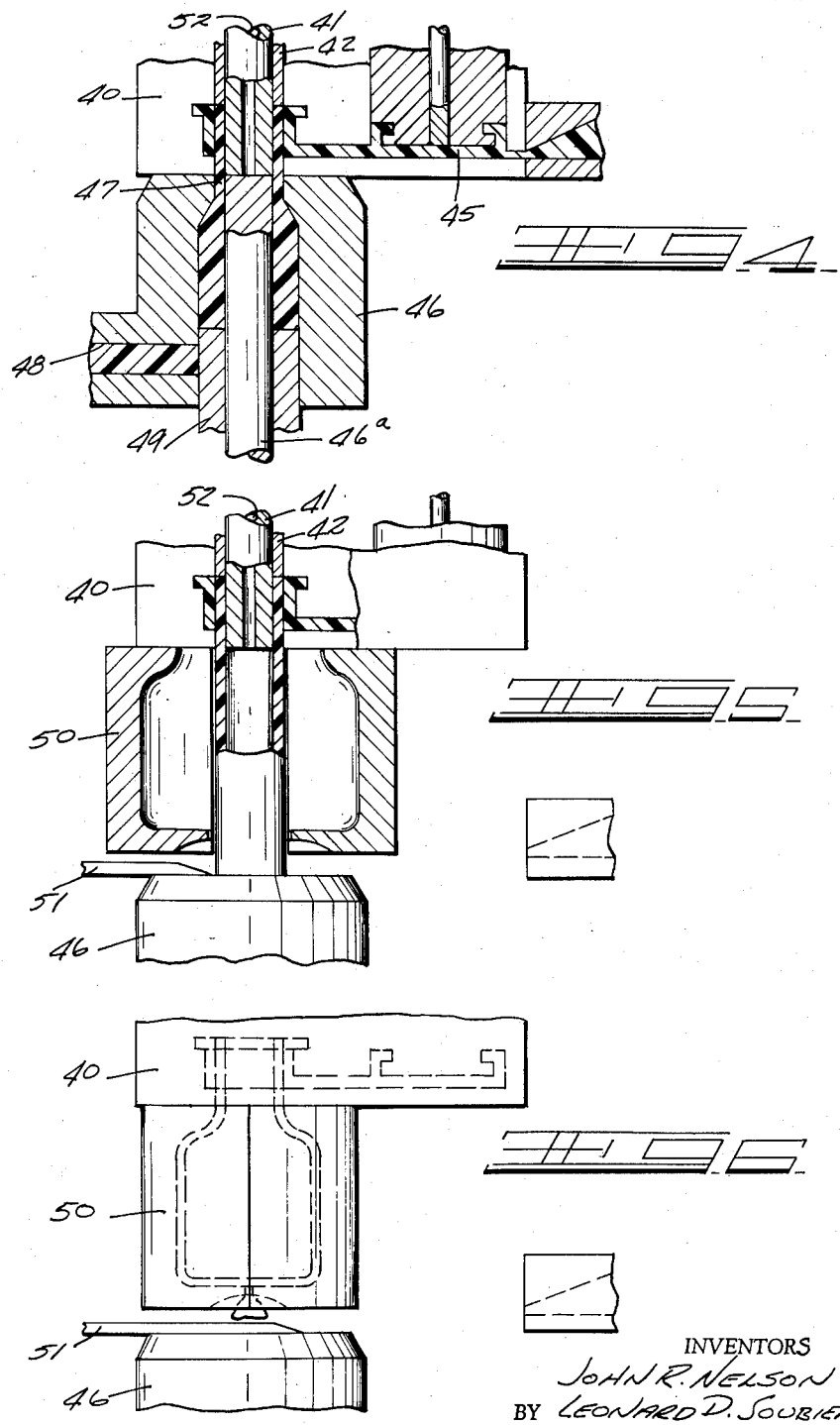

April 23, 1963  J. R. NELSON ET AL  3,086,249
METHOD OF PRODUCING COMPOSITE PLASTIC ARTICLES
Filed Dec. 11, 1959  5 Sheets-Sheet 3
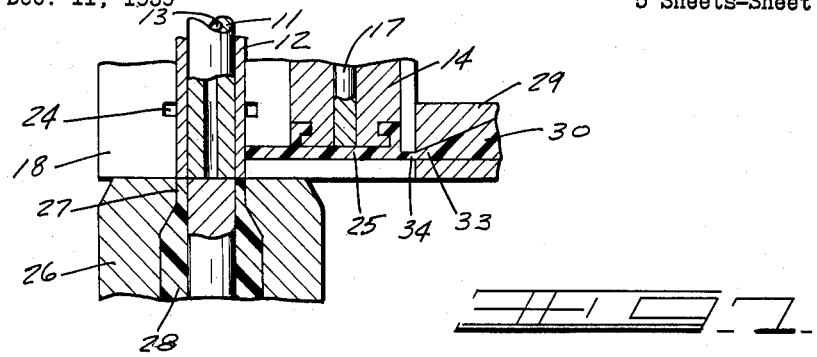
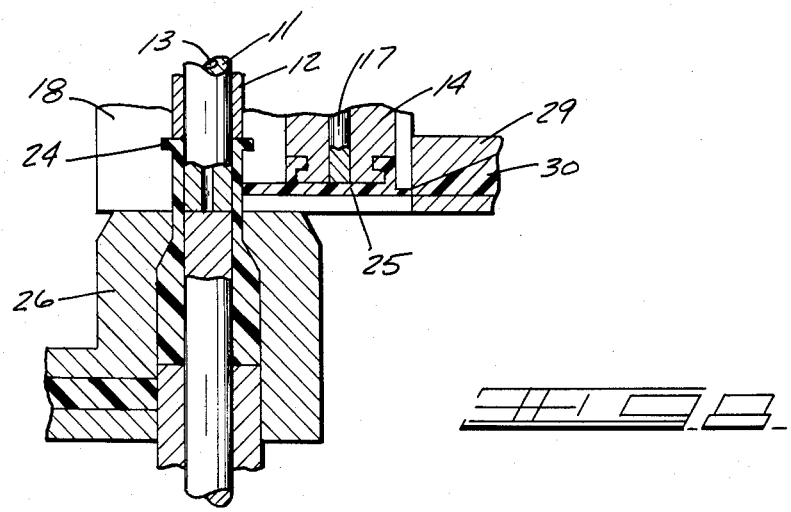
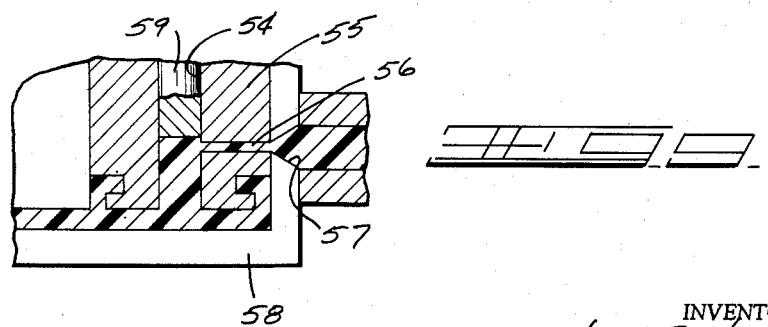
INVENTORS
JOHN R. NELSON
BY LEONARD D. SOUBIER
ATTORNEYS April 23, 1963     J. R. NELSON ET AL     3,086,249
METHOD OF PRODUCING COMPOSITE PLASTIC ARTICLES
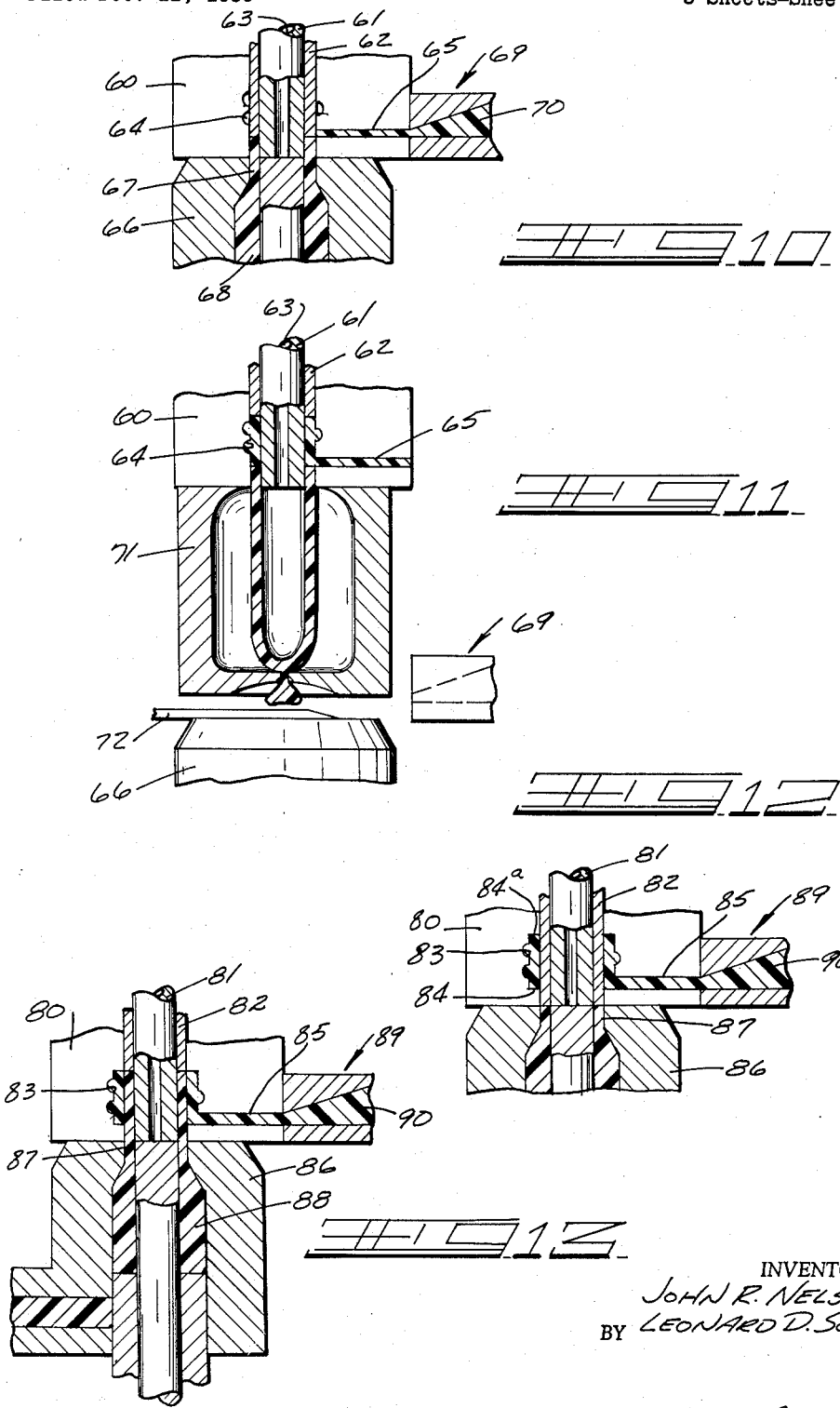
INVENTORS
JOHN R. NELSON
BY LEONARD D. SOUBIER
ATTORNEYS April 23, 1963   J. R. NELSON ET AL   3,086,249
METHOD OF PRODUCING COMPOSITE PLASTIC ARTICLES
Filed Dec. 11, 1959   5 Sheets-Sheet 5
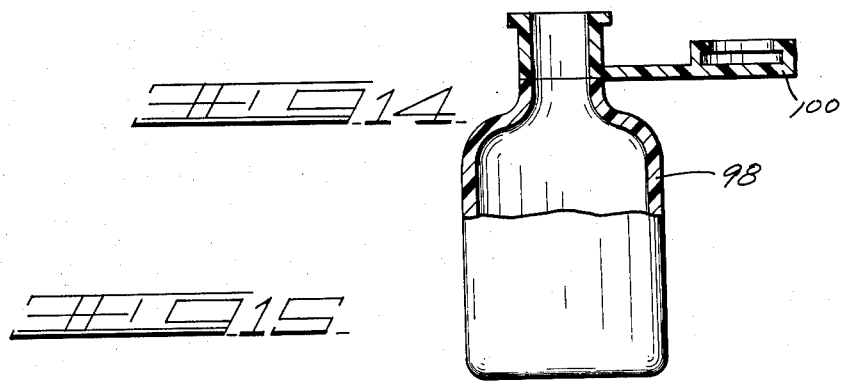
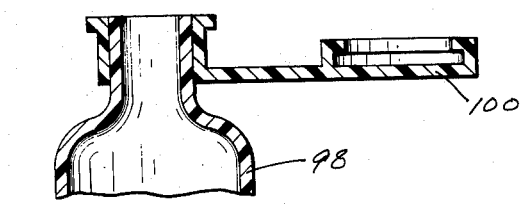
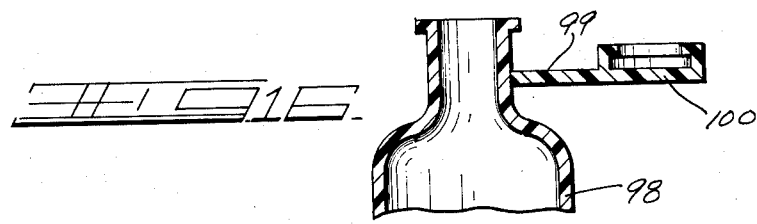
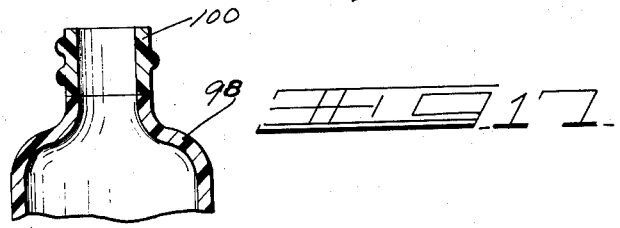
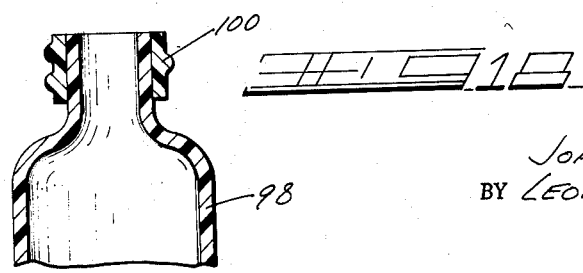
INVENTORS
JOHN R. NELSON
BY LEONARD D. SOUBIER
ATTORNEYS United States Patent Office 3,086,249
Patented Apr. 23, 1963

3,086,249
METHOD OF PRODUCING COMPOSITE
PLASTIC ARTICLES
John R. Nelson and Leonard D. Soubier, Toledo, Ohio, assignors to Owens-Illinois Glass Company, a corporation of Ohio
Filed Dec. 11, 1959, Ser. No. 859,044
4 Claims. (Cl. 18—55)

This invention relates to a composite plastic article and to a method for forming said composite plastic article from two dissimilar thermoplastic compositions. For the purpose of this disclosure, the terms "dissimilar thermoplastic compositions" or "dissimilar thermoplastic material" will means thermoplastics composed of dissimilar chemical compositions, of similar chemical compositions but of different colors, or of dissimilar chemical compositions and different colors.

It is contemplated by this invention to provide a method of forming a plastic container of dissimilar thermoplastic compositions, one thermoplastic composition being used to form the neck and integral attachments thereof, and the other thermoplastic composition to form the remainder or body of the container. The first thermoplastic may be selected to utilize those properties for providing the desired closure and neck finish. The second thermoplastic may be selected for those desirable properties of impermeability, rigidity, ductility, etc., as the case may be. In a situation where the container is intended to be used to contain a specific product, the neck and attachment portion of the container may be formed of a first thermoplastic composition suitable for achieving a sealing relationship with a closure and the body portion may be formed of a second thermoplastic composition compatible with the specific product. Dissimilar organic thermoplastic compositions may be used for the independent molding operations and a decorative package may be formed by using different colored plastic materials of either similar or dissimilar composition to form the separately molded portions of the container. It is also possible to form a plastic container from two dissimilar thermoplastic materials wherein the neck portion of the container is formed from a first thermoplastic composition and the body portion is formed from a second thermoplastic composition capable of forming a cellular type wall in the container. This would provide a container with a relatively strong, rigid neck portion and a light pliable body portion.

It is further contemplated by this invention to provide as an article of manufacture a plastic container formed of two dissimilar thermoplastic compositions.

It is an object of this invention to provide a composite hollow plastic article in which one portion is formed of one thermoplastic composition and the second portion is formed of a second thermoplastic composition.

It is another object of this invention to provide a method for forming a composite plastic article from two separate thermoplastic compositions.

An additional object of this invention is to form a composite hollow plastic article in which one portion is injection molded of one thermoplastic composition and a second portion is formed by the extrusion of a second thermoplastic composition.

A further object of this invention is to provide a method for forming hollow plastic containers having a reinforced neck portion.

A still further object of this invention is to provide a method for forming hollow plastic containers in which the neck portion is formed of two different thermoplastic compositions.

The specific nature of this invention, as well as other objects and advantages thereof, will become apparent to those skilled in the art from the following detailed description thereof taken in conjunction with the annexed sheets of drawings on which, by way of example only, are illustrated several embodiments of this invention.

In the accompanying drawings:

FIG. 1 is a schematic elevational view partly in cross-section of a plastic molding apparatus illustrating the first step in a method of the invention.

FIG. 2 is a view similar to FIG. 1 at the point in the cycle where both thermoplastic compositions have been fed to the mold cavity and cut off.

FIG. 3 is an enlarged schematic elevational view partly in section of a second embodiment.

FIG. 4 is a view similar to FIG. 3 but on a reduced scale at the point in the cycle where the mold cavity is full.

FIG. 5 is a view similar to FIG. 4 at the point in the cycle just prior to closing of the blow mold.

FIG. 6 is a schematic elevational view of the second embodiment at the point in the cycle where the article has been completely formed.

FIGS. 7 and 8 are views similar to FIGS. 1 and 2 illustrating two steps in the cycle of a third embodiment.

FIG. 9 is an enlarged sectional view of a modified closure core and cooperating nozzle.

FIGS. 10 and 11 are schematic elevational views, partly in section, illustrating two steps of a fourth embodiment of the invention.

FIGS. 12 and 13 are schematic elevational views, partly in section, illustrating two steps of a fifth embodiment of the invention.

FIG. 14 is an elevational view, partly in section, of a composite container according to the invention.

FIGS. 15–18 are fragmentary elevational, sectional views of the neck portion of composite containers according to the invention.

The method of this invention is primarily concerned with forming a composite plastic article having one portion formed of a first thermoplastic composition and another formed of a second dissimilar thermoplastic composition. A heated quantity of the first thermoplastic composition is forced into a mold cavity defining said one portion of the article. A heated quantity of the second thermoplastic composition is forced into a mold cavity which defines another portion of the article and the compressive forces are maintained on the first and second thermoplastic compositions until the contacting areas thereof are bonded together.

Referring to FIGS. 1 and 2, there is illustrated an apparatus for concurrently molding a container from one thermoplastic composition and a captive closure for such container of a dissimilar thermoplastic composition. A generally horizontal mold carriage 10 has a downwardly extending cylindrical neck core 11 extending therethrough with its lower end projecting below the under surface thereof. A cylindrical sleeve 12 surrounds the neck core 11 and likewise projects through the mold carriage 10. This sleeve is mounted for vertical sliding movement relative to the neck core 11 and the mold carriage 10.

A cylindrical closure core 14 is threadedly connected at 15 to the mold carriage 10 at a point transversely removed from the location of the neck core 11 and extends in a vertically downward direction from the bottom surface of the mold carriage 10. The lower end of the closure core 14 has a generally inverted T-shape in cross-section. A vertical coaxial opening 16 through the closure core 14 provides the support and guidance for an elongated ejector plunger 17 which is slidably movable therein.

A partible mold 18 having outwardly projecting flanges 19 along the upper edges thereof is slidably held against the bottom surface of the mold carriage 10 by means of elongated angle members 20 connected to the underside of the carriage 10 cooperating with the flanges 19. The angle members 20 are fastened to the mold carriage 10 by means of bolts 21. The mold 18 is thus mounted for horizontal sliding movement relative to the mold carriage 10. Movement of the partible mold 18 to its closed position provides an attachment and neck forming cavity 24 surrounding the neck core 11 and also provides closure forming cavity 25 at the lower end of the closure core 14. The two cavities 24 and 25 are joined together by a narrow connecting cavity 25a provided in the mold 18 and in the form of a composite mold.

An extrusion head 26 having an annular outlet orifice 27 is positioned below the composite mold 18 and is arranged to force a first heated thermoplastic material 28 into the neck forming cavity 24 surrounding the neck core 11. As the material 28 is being extruded into the cavity 24, the sleeve 12 forms a barrier limiting the extent of movement of the material 28 into the cavity. The lower end of the sleeve 12, as shown in FIG. 1, allows the material 28 to only partially fill the cavity 24.

A relatively small opening 34 is provided in the right side of the mold 18 in communication with the closure forming cavity 25. An injection head 29 having an outlet orifice 33 is mounted adjacent the right side of the mold 18 such that a second heated thermoplastic material 30 may be forced through the small opening 34 into the closure forming cavity 25 of the composite mold 18.

The second thermoplastic material 30 is supplied to the injection head 29 by means of an extruder 31 through an extruder valve 32. A piston 35 slidable in the injection head 29 is powered by a fluid motor 37 connected to the piston 35 by means of a rod 36. Upon actuation of the piston 35 by the motor 37, the thermoplastic material contained in the injection head 29 is forced therefrom through the outlet orifice 33 in registry with the opening 34 and into the closure forming cavity 25 of the composite mold 18. The volume of thermoplastic material in the injection head 29 and the stroke of piston 35 may be proportioned to not only fill the closure forming cavity, but also to fill a part of the connecting cavity 25a, or, if desired, and as specifically illustrated in FIG. 2, the volume of thermoplastic material supplied may be sufficient to also substantially fill the neck forming cavity 24 after retraction of the sleeve 12.

With the extruder head 26 in abutting relationship, with the bottom of the mold 18 in coaxial alignment with the neck core 11, the first thermoplastic material 28 is forced from the head 26 into the neck defining cavity 24 to an extent determined by the position of the end of the sleeve 12. After this portion of the neck has been formed, the sleeve 12 is retracted to its position shown in FIG. 2, wherein it serves as the upper barrier of the neck defining cavity 24. With the sleeve in this retracted position, the second thermoplastic material 30 is injected into the cavity 25 through the connecting passage 25a and completely fills the remaining portion of the neck cavity 24. After the second thermoplastic material has been injected into the composite mold and the two thermoplastic compositions have become bonded at their contacting area, the composite mold 18 and mold carriage 10 are moved vertically with respect to the injection head 29 and the extruder head 26. At the same time that the composite mold is being moved vertically, additional first thermoplastic material is extruded from the head 26 through the annular orifice 27 thus forming a hollow plastic tubing integral with the first thermoplastic material in the mold cavity 24. After the composite mold 18 has reached its uppermost limit, a partible blow mold 38 is closed about the thermoplastic tubing pinching together the lower end of the tubing to close off and seal one end of the tubing. A severing knife 39 having suitable actuating means (not shown) may be moved across the upper surface of the head 26 to sever the thermoplastic material from the extruder. With the thermoplastic thus enclosed within the blow mold 38, fluid under pressure is admitted to the interior of the tubing by means of a passage 13 extending axially through the neck core 11. Thus the extruded tubing is expanded within the mold 38 to conform with the internal shape of the mold.

The vertical movement of the composite mold 18 also serves to sever the second thermoplastic material 30 in the injection head 29 from the mold 18 by reason of the fact that the injection head 29 is separately mounted and does not move with the composite mold 18.

Referring to FIGS. 3–6, in which a second embodiment is illustrated, there is shown an arrangement which is similar to that shown in FIGS. 1 and 2 but where a reinforced or laminated neck is formed. In this second embodiment a cylindrical sleeve 42 is slidably received around a neck core 41 and its outer surface provides the limit of the internal diameter of the outer lamination of a neck reinforcing thermoplastic material. A partible composite mold 40 is adapted to close about the sleeve 42 and neck core 41 and forms an annular cavity 43 surrounding the sleeve 42. This cavity 43 is limited in its axial length by internal annular shoulders 44 and 44a that closely embrace the sleeve 42. A first thermoplastic material is forced into the neck forming cavity 43 in an amount sufficient to completely fill the cavity 43 and integral closure cavity 45. After the cavities 43 and 45 have been completely filled, the sleeve 42 is moved vertically upward until its lower edge is in alignment with the shoulder 44a of the neck forming cavity 43. An extrusion head 46, having a mandrel 46a therein forming an annular outlet orifice 47, is in abutting relationship with the under surface of mold 40 and is adapted to feed a second thermoplastic material.

The second thermoplastic material is supplied to the interior of the extrusion head 46 from a plasticizer and extruder (not shown) through a supply passage 48. A tubular element 49 is mounted for reciprocable sliding movement within the extrusion head 46 and surrounds the mandrel 46a. Upon vertical movement of the tubular element 49 a small distance to the position shown in FIG. 4, the second thermoplastic material is forced through the orifice 47 and into the mold, filling the space therein left by the retraction of the sleeve 42. Vertical movement of the tubular element 49 also results in a cutting off of the supply passage 48 from the interior of extrusion head 46. The injector head pressure and the pressure developed by movement of the tubular element 49 act in opposition and thus provide a bonding pressure between the contacting areas of the two thermoplastic materials. After the reinforced neck portion has been formed, the mold 40 is moved vertically upward and the tubular element 49 in the extrusion head 46 is moved vertically downward, opening passage 48 to the head 46, and additional thermoplastic material in tubular form is extruded integral with the second thermoplastic material within the mold. With the composite mold 40 separated from the extrusion head 46, a partible blow mold 50 is closed about the thermoplastic tubing formed by extrusion from the extruder head 46 and air is admitted under pressure through a passage 52 in the neck core 41 and the tubing is expanded to conform with the internal configuration of the mold 50.

FIG. 6 shows in dotted lines the shape of the formed article when completely formed and retained within the blow mold and composite neck mold. A severing knife 51 is moved across the face of the extrusion head 46 and severs the tail portion of the extruded thermoplastic tubing.

Referring to FIGS. 7 and 8 there is disclosed apparatus similar to that described above with respect to FIGS. 1 and 2. Similar reference numerals have been applied to like elements of FIGS. 7 and 8 as applied to FIGS. 1 and 2. The essential difference between FIGS. 7 and 8 and FIGS. 1 and 2 is in the method of operating the device and the resulting composite container formed thereby.

In contrast to the operation of the device disclosed in FIGS. 1 and 2, the thermoplastic composition 30 is first forced from an injection head 29 through its outlet orifice 33 into a small opening 34 in the side wall of a composite mold 18, and thence into and filling a cavity 25 which forms the closure cavity. The thermoplastic composition 30 injected into and completely filling the closure cavity extends to and abuts the outer surface of a sleeve 12 surrounding the neck core 11. The sleeve 12 is then retracted until its lower edge is in alignment with the upper surface of the neck forming cavity 24. At this time the second thermoplastic material is extruded into the cavity 24 from which the sleeve 12 has been retracted thus forming a container having a neck portion formed of one thermoplastic composition and a captive closure formed of a second thermoplastic composition. The operation of the device disclosed in FIGS. 7 and 8 is thus more or less a reversal of the extrusion steps as set forth in the description of FIGS. 1 and 2.

Referring to FIG. 9, there is shown a modified form of a closure core which may be used with any of the previously described embodiments. In this form a closure core 55 is mounted on a mold carriage (not shown) and has a radial passage 56 extending therethrough and communicating at one end with a tapered port 56 in the side of a partible composite mold 58. A vertical passage 54 extends throughout the entire length of the closure core 55 and communicates with the other end of passage 56. A plunger 59 is slidably received within the passage 54. Actuation of plunger 59 in a vertically downward direction, from its position shown in FIG. 9, until its lower end is flush with the bottom edge of the closure core, will serve to cut off the thermoplastic material being forced through the passage 56 and apply pressure to the thermoplastic material contained within the closure cavity and connecting neck cavity to insure a complete filling of these cavities. After the thermoplastic article has been completely formed and cooled, the composite mold 58 is opened and the plunger 59 is then moved vertically downward to a further extent to effect the stripping of the finished plastic closure from the closure core.

Referring to FIGS. 10 and 11, there are illustrated two steps involved in forming an article having a first thermoplastic composition forming its neck and attachment portion and a second thermoplastic composition forming the body of the container. A partible neck defining mold 60 having a neck core 61 extending vertically downward therethrough defines an annular neck and thread forming cavity 64 surrounding the neck core 61. A passage 65 extending radially outward from the neck defining cavity 64 communicates at its outer end with the injection nozzle 69 containing a supply of thermoplastic material 70 therein. The passage 65 is sealed against communication with the neck defining cavity 64 by means of a sleeve 62 extending down into the neck defining cavity 64 in surrounding relationship with respect to the neck core 61. The sleeve 62 is initially positioned so that its lower end completely closes off the communicating passage 65.

An extrusion head 66 having an annular outlet orifice 67 is positioned directly below and in alignment with the neck forming cavity. A thermoplastic material 68 is forced from the extrusion head 66 into the neck defining cavity 64 and fills the portion of cavity 64 defined by the lower end of the sleeve 62 and the internal walls of the mold 60 and the neck core 61. As shown in FIG. 11, the thermoplastic material 70 is extruded into and completely fills the remaining portion of the neck defining cavity 64 upon retraction of the sleeve 62. The sleeve 62 defines the upper limit of penetration of the thermoplastic material into the annular cavity 64 surrounding the neck core 61. After both thermoplastic materials have been forced into the neck defining cavity, the neck defining mold 60 is moved vertically and the extrusion nozzle 66 continues to extrude thermoplastic material in tube form which is integral with the material forming the lower neck portion of the container to be formed. Vertical movement of the neck mold 60 with respect to the injection nozzle 69 serves to cut off the supply of thermoplastic material 70 from the injection nozzle 69. When the neck defining mold 60 has been moved to its upper limit, a partible mold 71 moves across the underside of the neck defining mold and pinches off the lower portion of the extruded thermoplastic tubing. At this time a knife 72 may be moved across the top surface of the extrusion head 56 to sever the pinched material from the extrusion nozzle 66. Air under pressure then may be fed to the interior of the thermoplastic tubing contained within the blow mold 71 through a passage 63 extending axially through the neck core 61.

Referring to FIGS. 12 and 13, there is disclosed apparatus for forming a composite container in which the outer thread container portion of the neck is formed of a first thermoplastic composition and the inner portion of the neck and the container body are formed of a second thermoplastic composition. A partible neck mold 80 having a cavity 83 therein is adapted to close about a neck core 81 which has a sleeve 82 telescopically received thereon for vertical movement relative to the neck core 81. In its initial position the sleeve 82 has its lower end in the same plane as the lower end of the neck core 81 and the bottom surface of the mold 80. At this time thermoplastic material 90 is injected into the neck defining cavity 83 and through a radial passage 85 from an injection nozzle 89. The neck defining cavity 83 is limited in its axial length by means of internal shoulders 84 and 84a formed in the neck mold 80. After the first thermoplastic material 90 is injected into the cavity surrounding the tubular sleeve 82, the sleeve 82 is retracted until its lower surface is in alignment with the shoulder 84a of the cavity 83. At this time an extrusion nozzle 86, in abutting relationship directly below and in alignment with the neck core 81, extrudes a second heated thermoplastic composition 88 through an extrusion orifice 87 into the portion of cavity 83 previously occupied by the sleeve 82 and forms an internal plastic sleeve within the outer thread containing portion of the neck formed of the first thermoplastic material. Obviously the process is carried forward through the advent of extrusion of additional thermoplastic composition 88 integral with the second thermoplastic composition in tubular form and this tubular composition is then formed into the body portion of the container in the same manner as described with respect to the above described embodiments.

FIGS. 14–18 disclose containers which form a part of this invention and the two thermoplastic materials used to form these containers are numbered 98 and 100. As can be readily seen with respect to FIG. 14, a hollow plastic container is provided wherein the neck portion and closure have been formed of a first thermoplastic composition 100 and the body portion has been formed of a second thermoplastic composition 98 bonded thereto at the juncture of the neck to the body.

FIG. 15 discloses the first thermoplastic composition 100 in laminated form about a second thermoplastic composition 98 which forms the body portion and the inside of the neck portion of a container. A captive closure is also formed of the thermoplastic material 100 which forms the neck reinforcing laminate and attachment portion of the neck of the container.

In FIG. 16, the container has its neck and attachment portion formed of a first thermoplastic composition 98 and the captive closure is formed of a second thermoplastic composition 100 bonded by the attaching portion 99 to the side of the neck of the first thermoplastic composition 98 forming the container.

FIG. 17 shows another modification in which the container is formed of a first thermoplastic composition 98 and its neck is formed of a second thermoplastic composition 100 having a threaded attachment portion which in cooperation with a closure cap will form a liquid tight container.

FIG. 18 discloses a somewhat similar attachment portion as is disclosed in FIG. 17 with the exception that in FIG. 18 the threaded portion of the neck is formed as an annular reinforcing portion formed of a thermoplastic composition 100 dissimilar from the composition 98 which forms the main body portion of the container.

It should be readily apparent how the containers are formed from the detailed description of the figures of the drawings as set forth above. With particular reference to FIGS. 1 and 2, the operation of the device, as well as the steps of the method which form this invention, will be set forth. A composite mold 18 having a neck forming cavity 24 and communicating closure forming cavity 25 is positioned to receive thermoplastic material from two sources of heated thermoplastic material. A sleeve 12 is positioned within the neck forming cavity 24 in such a position as to block off the communicating passage 25a to the closure forming cavity 25 and a first thermoplastic material 28 is fed from an extruder into the lower portion of the neck forming cavity. The sleeve 12 is then retracted to the position shown in FIG. 2 where its lower end will form the upper limit of travel of a second thermoplastic material 30 which is injected into the closure forming cavity and into the area of the neck forming cavity that was previously occupied by the sleeve 12. Both the thermoplastic materials are under pressures individual thereto and thus a good bond will be formed at the area of contact between the two thermoplastic materials within the neck cavity. After the neck and closure have been formed the composite mold is elevated and the first thermoplastic material 28 is extruded in tubular form integral with the first thermoplastic material in the neck forming cavity 24. Elevating the composite mold will effect severance of the second thermoplastic material 30 at the point 34 of introduction of the second thermoplastic material by reason of the fact that the injection nozzle 29 remains stationary during the elevating of the composite mold. A partible blow mold 38 is then closed about the extruded thermoplastic tubing and by reason of its configuration will pinch closed the lower end of the tubing. With the tubing thus confined within the blow mold 30, fluid under pressure is introduced within the enclosed tubing and the thermoplastic material is expanded to conform to the internal configuration of the blow mold. After the formed container and captive closure have cooled a sufficient amount, the blow mold 38 is opened and the composite mold 18 is opened. A completed container will thus be suspended from the neck core 11 and closure core 14. In order to separate the container from the cores, an ejector plunger 17 extending coaxially through the closure core 14 is moved vertically downward and will cause the release or stripping of the formed closure from the closure core.

Modifications may be resorted to within the spirit and scope of the invention as set forth in the appended claims.

We claim:

1. The method of forming a hollow plastic article having a closure integral with the neck thereof comprising closing a partible neck and closure defining mold, bringing an extrusion head having an annular orifice into coaxial alignment with the neck defining portion of said mold, extruding a first heater thermoplastic material from said head into and partially filling said neck defining portion of said partible mold under predetermined pressure, interrupting said extrusion pressure, bringing an injection head into horizontal alignment with the closure defining portion of said partible mold and spaced from said extrusion head, injecting a second heated thermoplastic material through the communicating closure defining portion of the mold into and filling the remainder of the neck defining mold, reestablishing said extrusion pressure, moving said mold in a vertical direction away from said extrusion head and injection head, simultaneous therewith continuing the extrusion of said first thermoplastic material to form a tube integral with the molded neck portion, and expanding said tube within a mold cavity to form a hollow body thereof integral with the neck.

2. The method as set forth in claim 1 wherein said first and second thermoplastic compositions are similar in composition but dissimilar in color.

3. The method as set forth in claim 1 wherein said first and second thermoplastic compositions are dissimilar in composition and physical characteristics.

4. The method of forming a hollow plastic article having a closure integral with the neck thereof comprising closing a partible neck and closure defining mold, bringing an injection head into horizontal alignment with the closure defining portion of said partible mold, injecting a first heated thermoplastic material through the communicating closure defining portion of the mold into and filling a first portion of the neck defining mold, bringing an extrusion head having an annular orifice into coaxial alignment with the neck defining portion of said mold, extruding a second heated thermoplastic material from said head into and filling the remainder of said neck defining portion of said partible mold under predetermined pressure, moving said mold in a vertical direction away from said extrusion head and injection head, simultaneously therewith continuing the extrusion of said second thermoplastic material to form a tube integral with the molded neck portion, and expanding said tube within a mold cavity to form a hollow body thereof integral with the neck.

References Cited in the file of this patent

UNITED STATES PATENTS

| | | |
|---|---|---|
| 2,432,870 | Evalt | Dec. 16, 1947 |
| 2,544,140 | Dofsen et al. | Mar. 6, 1951 |
| 2,562,523 | Brunet | July 31, 1951 |
| 2,655,968 | Simmons | Oct. 20, 1953 |
| 2,626,647 | Barton | Jan. 27, 1953 |
| 2,673,374 | Strahm | Mar. 30, 1954 |
| 2,710,987 | Sherman | June 21, 1955 |
| 2,713,369 | Strahm | July 19, 1955 |
| 2,750,625 | Colombo | June 19, 1956 |
| 2,781,551 | Richerod | Feb. 19, 1957 |
| 2,830,721 | Pinskey et al. | Apr. 15, 1958 |
| 2,836,319 | Pinskey et al. | May 27, 1958 |
| 2,878,520 | Mumford et al. | Mar. 24, 1959 |
| 2,911,673 | Soubier | Nov. 10, 1959 |
| 2,936,481 | Wilkalis | May 17, 1960 |
| 2,936,489 | Sherman | May 17, 1960 |
| 2,980,955 | Sanko | Apr. 25, 1961 |
| 2,982,993 | Jacobi | May 9, 1961 |

FOREIGN PATENTS

| | | |
|---|---|---|
| 62,145 | France | Dec. 29, 1954 |
| 1,159,247 | France | Feb. 10, 1958 |
| 606,972 | Great Britain | Aug. 24, 1948 |